United States Patent
Kennedy

(10) Patent No.: US 11,082,538 B2
(45) Date of Patent: Aug. 3, 2021

(54) OFF NODE DATA COMPACTION

(71) Applicant: DataStax, Inc., Santa Clara, CA (US)

(72) Inventor: Matthew Earl Kennedy, Santa Clara, CA (US)

(73) Assignee: Datastax, Inc., Santa Clara, CA (US)

( * ) Notice: Subject to any disclaimer, the term of this patent is extended or adjusted under 35 U.S.C. 154(b) by 142 days.

(21) Appl. No.: 16/020,939

(22) Filed: Jun. 27, 2018

(65) Prior Publication Data

US 2020/0007662 A1   Jan. 2, 2020

(51) Int. Cl.
*H04L 29/06* (2006.01)
*H04L 29/08* (2006.01)
*G06F 16/27* (2019.01)
*G06F 16/11* (2019.01)

(52) U.S. Cl.
CPC .............. *H04L 69/04* (2013.01); *G06F 16/27* (2019.01); *H04L 65/605* (2013.01); *H04L 67/10* (2013.01); *G06F 16/128* (2019.01)

(58) Field of Classification Search
CPC ....................................................... H04L 69/04
See application file for complete search history.

(56) References Cited

U.S. PATENT DOCUMENTS

| | | | | |
|---|---|---|---|---|
| 9,342,537 B2 * | 5/2016 | Kumarasamy | ........ | G06F 3/0689 |
| 10,346,431 B1 * | 7/2019 | Broda | ................... | G06F 16/182 |
| 2005/0149683 A1 * | 7/2005 | Chong, Jr. | .......... | G06F 11/1466 711/162 |
| 2015/0019485 A1 * | 1/2015 | Amdur | ..................... | G06F 16/27 707/624 |
| 2015/0019909 A1 * | 1/2015 | Griffith | ............... | G06F 11/1458 714/15 |
| 2015/0120656 A1 * | 4/2015 | Ramnarayanan | ... | G06F 16/2358 707/616 |
| 2016/0162562 A1 * | 6/2016 | Hattori | ..................... | G06F 16/22 707/620 |
| 2016/0217043 A1 * | 7/2016 | Bailey | ................. | G06F 11/1451 |
| 2016/0217044 A1 * | 7/2016 | Bailey | ................. | G06F 11/1451 |
| 2016/0306709 A1 * | 10/2016 | Shaull | ................. | G06F 11/1458 |
| 2018/0300205 A1 * | 10/2018 | Sehgal | .................. | G06F 16/166 |
| 2019/0278783 A1 * | 9/2019 | Lipcon | .................. | G06F 16/278 |
| 2019/0319839 A1 * | 10/2019 | Nozhchev | .................. | G06F 8/65 |

* cited by examiner

*Primary Examiner* — Esther B. Henderson
(74) *Attorney, Agent, or Firm* — Fenwick & West LLP

(57) ABSTRACT

Embodiments relate to a compacting datafiles generated by a database node using a compaction processing node with separate compute resources. The database node generates datafiles and stores the datafiles in a data store. To perform compacting of the datafiles, a snapshot of the data store is created and stored in a snapshot store separate from the data store. The compaction processing node is initiated and attached with the snapshot store. The compaction processing node generates a compacted datafile that is stored in the snapshot store. The database node replaces the data store with the snapshot store, and writes additional datafiles using the snapshot store as a new data store. The compaction processing node may be an instance of a cloud compute infrastructure that is initiated to perform the compaction to reduce compute resource usage by the database node.

16 Claims, 9 Drawing Sheets

OFF NODE DATA COMPACTION

BACKGROUND

The disclosure generally relates to managing databases, and in particular to compaction of database files.

Multiple files of a database may be merged into a compacted file. For example, compaction in a database system such as Cassandra may include compaction of sorted string tables (SSTables) that store associations between keys and values. Compaction of multiple SSTables into a compacted SSTable reduces the number of SSTables that are consulted to access records, and reclaims storage space taken by obsolete data in the SSTables. However, performing the compaction uses compute resources, resulting in fewer resources being available to operate the database and increased latency for serving requests.

SUMMARY

Some embodiments include a method for compacting datafiles in a compute infrastructure. A database node of the compute infrastructure stores datafiles in a first data store of the compute infrastructure attached with the database node. A snapshot of the first data store including the data files is generated, and stored in a second data store of the compute infrastructure. The second data store is attached with a compaction processing node of the compute infrastructure. The compaction processing node generates a compacted datafile by compacting the datafiles of the snapshot in the second data store, and stores the compacted datafile in the second data store. The second datastore is then attached to the database node, replacing the first data store. In some embodiments, the method includes initiating the compaction processing node in the compute infrastructure to perform the compacting of the datafiles.

Some embodiments include a system for compacting datafiles. The system includes a first data store, a database node, a second data store, and a compaction processing node. The database node is attached with the first data store. The second data store is attached with the compaction processing node. The database node stores datafiles in the first data store, and generate a snapshot of the first data store including the datafiles. The second data store stores the snapshot. The compaction processing node generates a compacted data file by compacting the datafiles of the snapshot in the second data store, and stores the compacted datafile in the second data store. The database node attaches with the second data store subsequent to the compacted datafile being stored in the second data store.

Some embodiments include a non-transitory computer readable medium storing instructions that when executed by a processor causes the processor to: store datafiles in a first data store of a compute infrastructure attached with the processor; generate a snapshot of the first data store including the datafiles; store the snapshot in a second data store of the compute infrastructure attached with a compaction processing node of the compute infrastructure; responsive to the compaction processing node generating a compacted datafile by compacting the datafiles of the snapshot in the second data store, attach with second data store.

DETAILED DESCRIPTION

Embodiments relate to compacting datafiles generated by a database node using a compaction processing node with separate compute resources from the database node. The database node and the compaction processing node are part of a compute infrastructure, such as instances in a cloud compute infrastructure. The database node generates datafiles and stores the datafiles in a data store. To perform compacting of the datafiles, a snapshot of the data store is created and stored in a snapshot store separate from the data store. In some embodiments, an instance of the compaction processing node is initiated in the cloud compute infrastructure, and attached with the snapshot store. The compaction processing node generates a compacted datafile from the datafiles of the snapshot, and the compacted datafile is stored in the snapshot store. The database node replaces the data store with the snapshot store, and writes additional datafiles using the snapshot store as a new data store. By performing an off node compaction separate from the database node, the compaction processing node reduces compute resource usage by the database node. The database node does not expend compute resources on compacting files, and the memory profile of the database node may be finely turned to serving database requests. The latency of the database node is improved because of lack of contention for compute resources during the compaction. Furthermore, the compaction can be cost optimized. Specialized compute resources, namely the compaction processing node, is used in the compaction process. Compaction tasks may be background jobs that leverage cloud purchasing strategies for the compaction processing node, initiating the compaction processing node only when needed for the compaction process.

Figure 1:
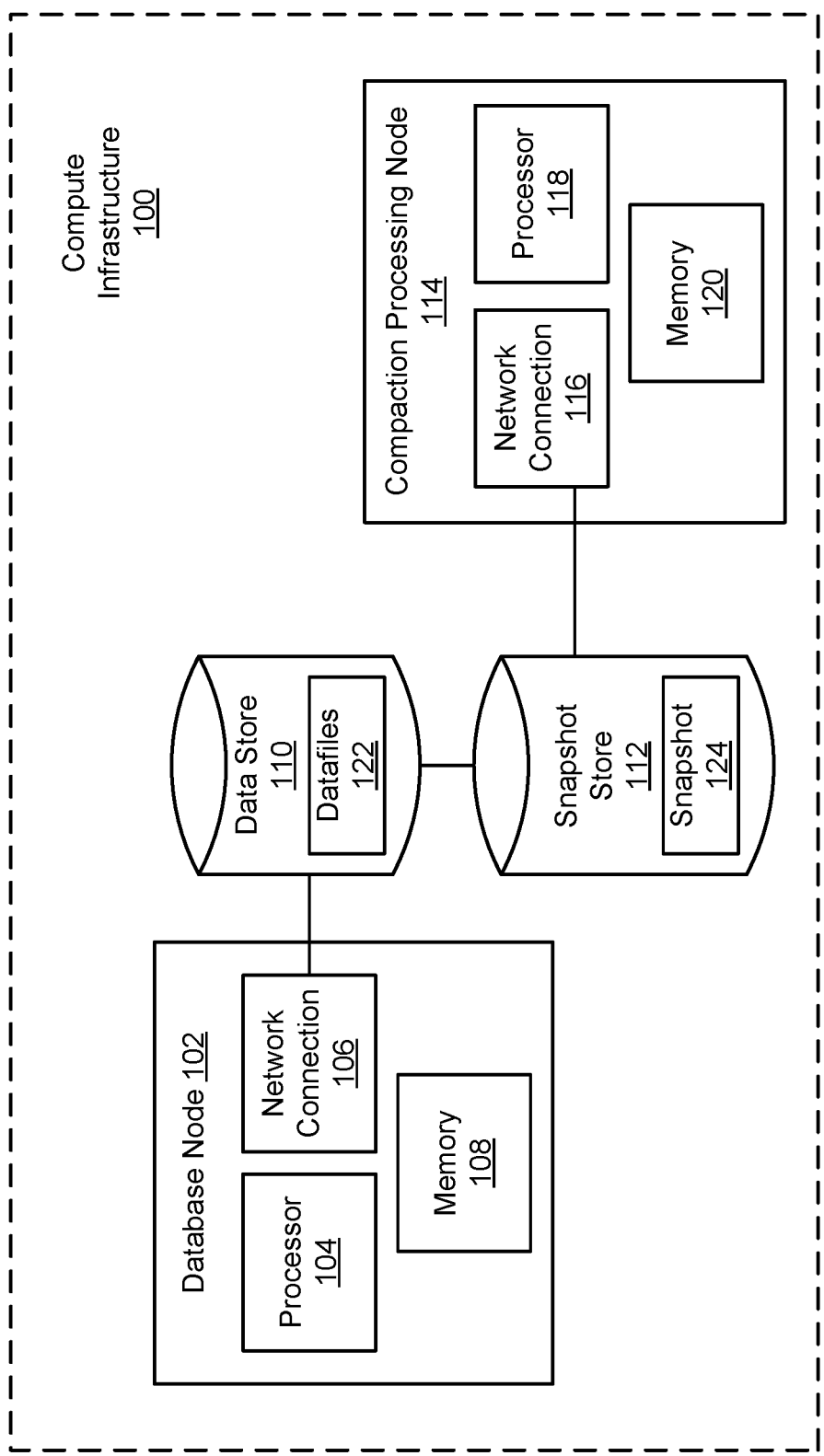
FIG. 1 is a schematic block diagram of a compute infrastructure, in accordance with some embodiments.

FIG. 1 is a schematic block diagram of a compute infrastructure 100, in accordance with some embodiments. The compute infrastructure 100 includes a database node 102, a data store 110, a snapshot store 112, and a compaction processing node 114. The database node 102 attached with the data store 110 to manage the data store 110. The database node 102 includes a processor 104, a network connection 106, and a memory 108. The memory 108 stores instructions that when executed by the processor 104, causes the processor 104 to control operation of the database node 102. For example, the processor 104 may service requests and update the data store 110 by writing datafiles 122 to the data store 110.

In some embodiments, the processor 104 stores data in the memory 108 (e.g., storing a memtable in Cassandra) until reaching a limit, and then the data is flushed from the memory 108, sorted by key and written to a datafile 122 (e.g., an immutable SSTable in Cassandra). A new datafile 122 may be created each time the memory 108 is filled and flushed. The SSTable provides a map from keys to values, where both keys and values are arbitrary byte strings.

The data store 110 is a storage volume that stores the datafiles 112 generated by the database node 102. Over time, multiple datafiles 122 accumulate in the data store 110. The network connection 106 couples the database node 102 to the data store 110 via a network, which may include a local area or wide area network (e.g., the Internet).

In some embodiments, the compute infrastructure 100 includes a cluster of connected database nodes 102. Each of the database nodes 102 in a cluster may be attached with the data store 110, or the data store 110 may be distributed across storage volumes of the database nodes 102 of the cluster.

The snapshot store 112 and compaction processing node 114 perform compaction of the datafiles 122 stored in the data store 110. The snapshot store 112 is a database coupled to the data store 110 to receive a snapshot 124 of the data store 110. The snapshot 124 may include the datafiles 122 that are stored in the data store 110. The compaction processing node 114 is separate from the database node 102, and performs the compaction using different processing and memory resources. As such, the database node 102 does not expend computing (e.g., processing or memory) resources on the compaction. Latency of the database node 102 is improved because of the lack of contention for the computing resources. The compaction is also cost optimized. The compaction processing node 114 provides specialized compute resources for the compaction that are separate from the compute resources of the database node 102.

The compaction processing node 114 includes a processor 118, a network connection 116, and a memory 120. The memory 120 stores instructions that when executed by the processor 118, causes the processor 118 to control the compaction of the datafiles of the snapshot 124 in the snapshot store 112. The network connection 116 attaches the compaction processing node 114 to the snapshot store 112 via a network, which may include a local area or wide area network (e.g., the Internet). The compaction processing node 114 generates a compacted datafile from the datafiles 122 of the snapshot 124 stored in the snapshot store 112, and stores the compacted datafile in the snapshot store 112.

After compaction of the datafiles of the snapshot 124 into a compacted datafile, the database node 102 may attach with the snapshot store 112 to use the snapshot store 112 as another data store 110. The database node 102 may write additional datafiles 122 to the new data store 110. Multiple additional datafiles 122 and the compacted datafile may also be compacted by a compaction processing node 114. Furthermore, the original data store 110 may be detached from the database node 102. In another example, the compacted datafile may be transferred from the snapshot store 112 to the data store 110. Here, the database node 102 uses the same data store 110 instead of attaching with the snapshot store 112.

In some embodiments, the compute infrastructure 100 is a cloud computing infrastructure. The database node 102, data store 110, snapshot store 112, and compaction processing node 114 are instances or virtual machines of the compute infrastructure 100 that may be initiated or shut down. The data store 110 and snapshot store 112 may be cloud storage volumes. The compaction may be a background job that is not time sensitive, and can leverage cloud purchasing strategies for the compaction processing node 114 or snapshot store 112. For example, the compaction processing node 114 may be initiated within the compute infrastructure 100 and attached with the snapshot store 112 to perform the compaction. Additional compute resources of the compute infrastructure 100 are deployed as needed for the compaction processing node 114. The compaction processing node 114 may be shut down and detached from the snapshot store 112 after the compacted datafile is generated from the snapshot 124, releasing the additional compute resources when not being used for the compaction processing node 114.

Figure 2:
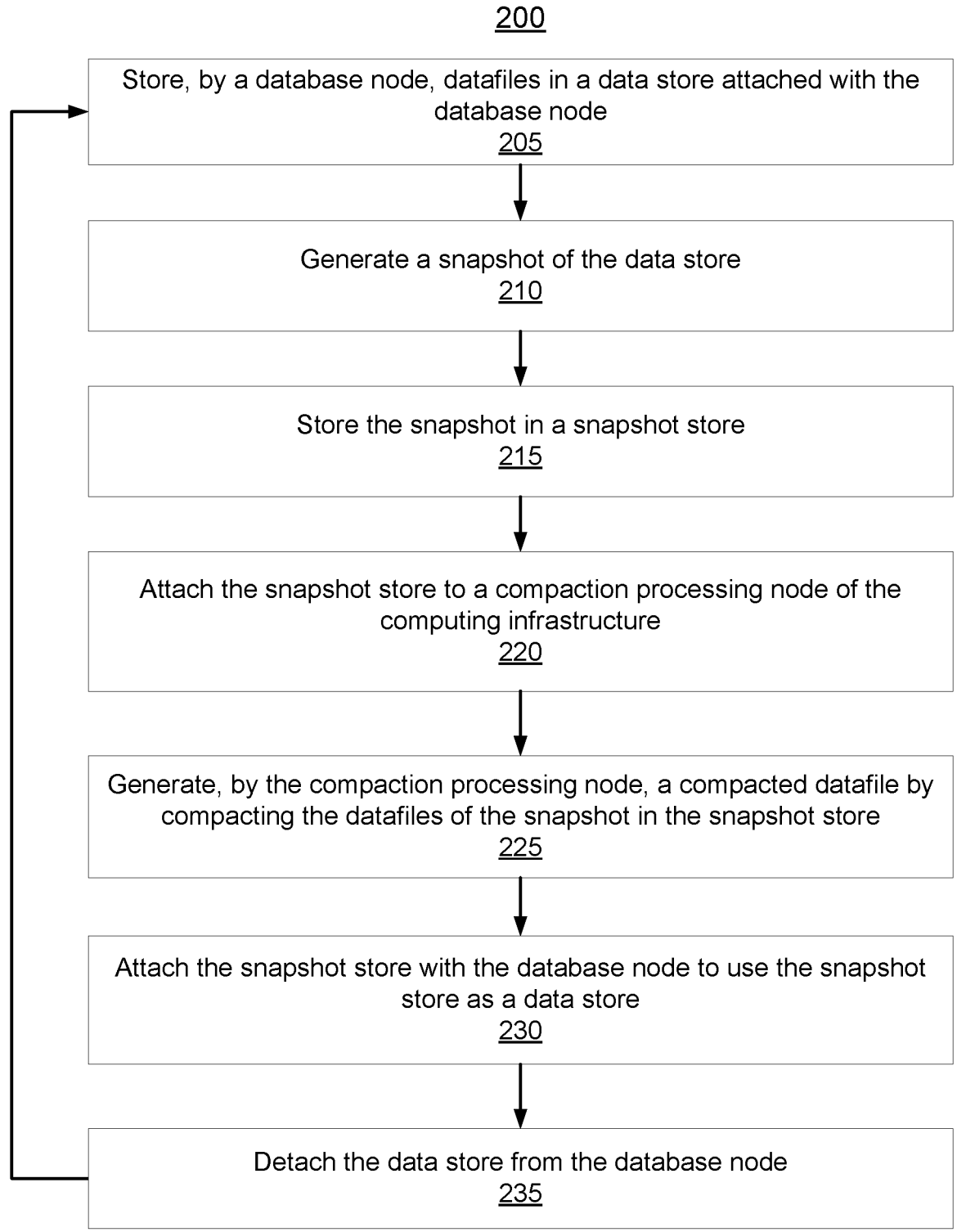
FIG. 2 is a flow chart of a process for compacting datafiles, in accordance with some embodiments.

FIG. 2 is a flow chart of a process 200 for compacting datafiles, in accordance with some embodiments. The process 200 may include additional or fewer steps, and steps may be performed in different orders. The process 200 is discussed with reference to FIGS. 3A, 3B, 3C, 3D, 3E, and 3F, which are schematic block diagrams of the compute infrastructure 100 performing the compaction.

Figure 3A:
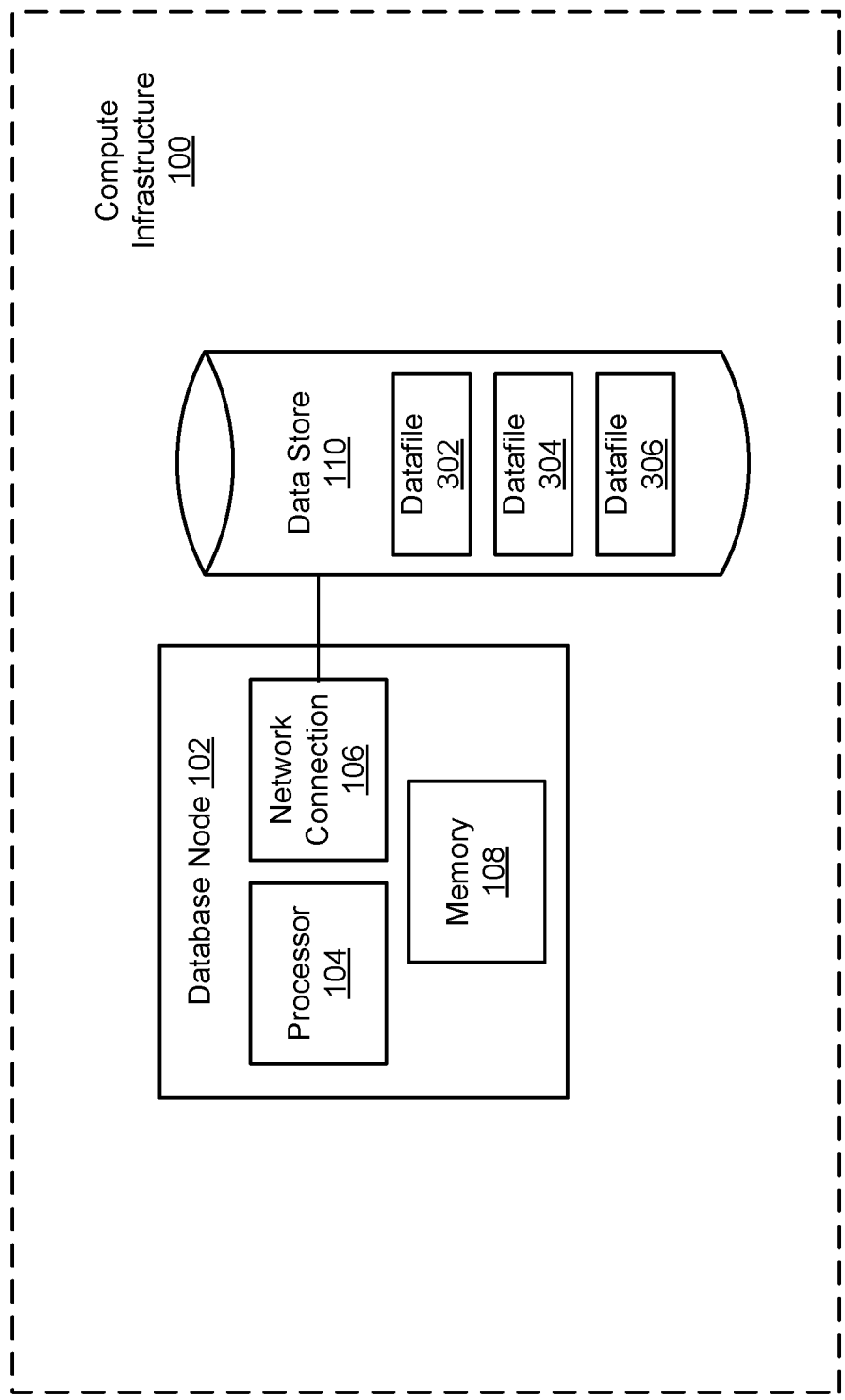
FIGS. 3A, 3B, 3C, 3D, 3E, and 3F are schematic block diagrams of the compute infrastructure performing compaction of datafiles, in accordance with some embodiments.

A database node 102 stores 205 datafiles 122 in a data store 110 attached with the database node 102. With reference to FIG. 3A, the compute infrastructure includes the database node 102 attached with the data store 110. The database node 102 generates multiple datafiles 302, 304, and 306, and stores the datafiles 302 through 306 in the data store 110. In some embodiments, the datafiles are immutable SSTables in Cassandra that store associations between keys and values for records in the data store 110. Over time, multiple datafiles accumulate in the data store 110 and a compaction process is initiated for the datafiles.

The database node 102 generates 210 a snapshot 124 of the data store 110. The snapshot 124 of the data store 110 includes a copy of the datafiles 302, 304, and 306. The database node 102 may pause datafile writes to the data store 110 to generate the snapshot 124 of the data store 110. After creation of the snapshot 124, the database node 102 may resume datafile writes.

Figure 3B:
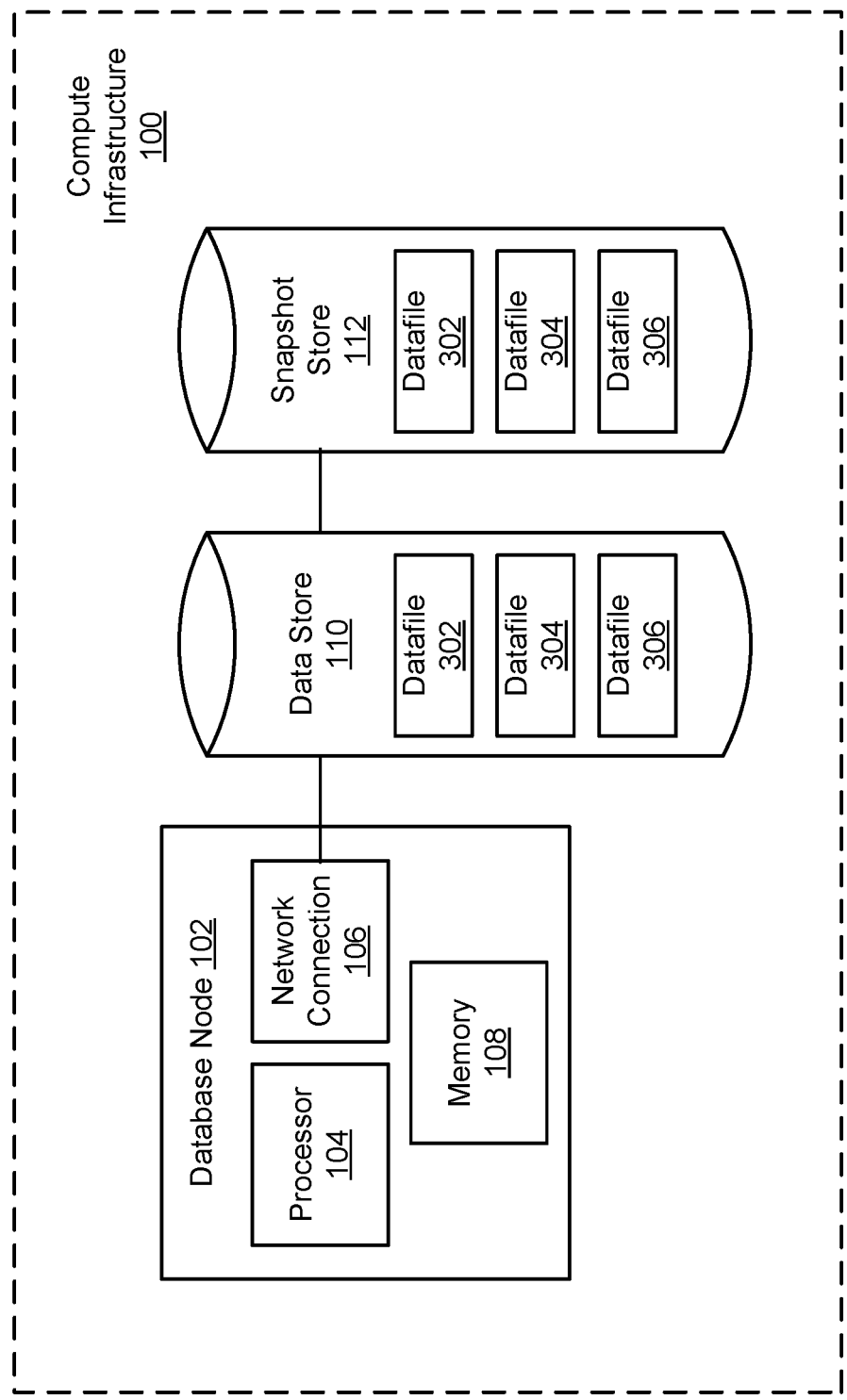

The database node 102 stores 215 the snapshot 124 in the snapshot store 112. The snapshot store 112 is another data store of the compute infrastructure 100 that is separate from the data store 110. With reference to FIG. 3B, the snapshot store 112 is initiated and coupled to the data store 110. The snapshot 124 of the data store 110 includes the datafiles 302, 304, and 306 of the data store 110, and thus the snapshot store 112 stores copies of the datafiles 302, 304, and 306. The snapshot 124 may be a snapshot of the entire data store 110 that is then instantiated as the snapshot store 112, or the snapshot 124 may include individual snapshots of the datafiles 302, 304, and 306 which are then copied to the snapshot store 112.

Figure 3C:
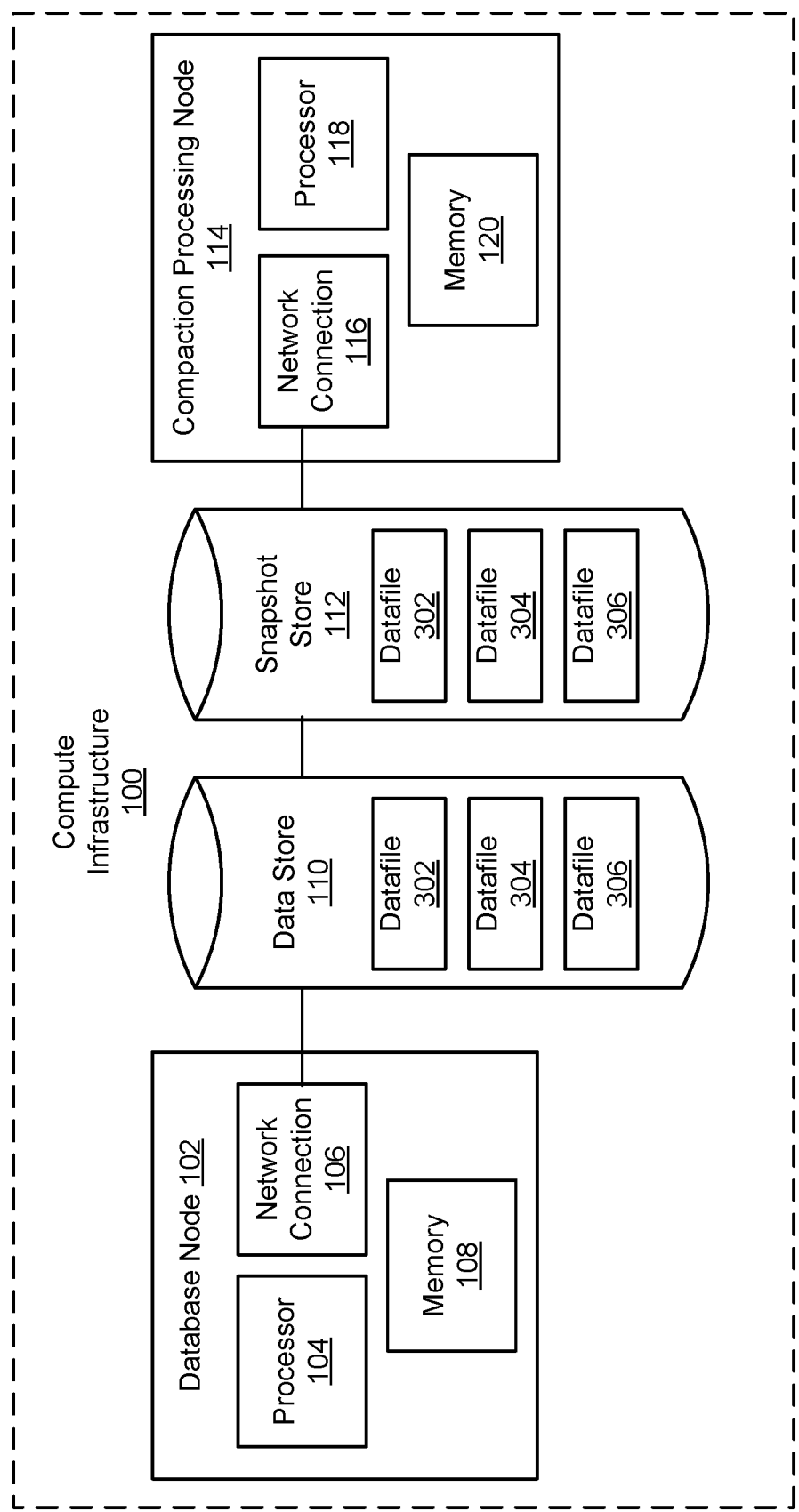

The snapshot store 112 is attached 220 with a compaction processing node 114. With reference to FIG. 3C, the compaction processing node 114 is initialized in the compute infrastructure 100 and attached with snapshot store 112. The compaction processing node 114 includes compute resources that are separate from the compute resources of the database node 102. In some embodiments, the compaction processing node 114 is an instance of a cloud compute infrastructure 100 that can be initiated or shut down.

Figure 3D:
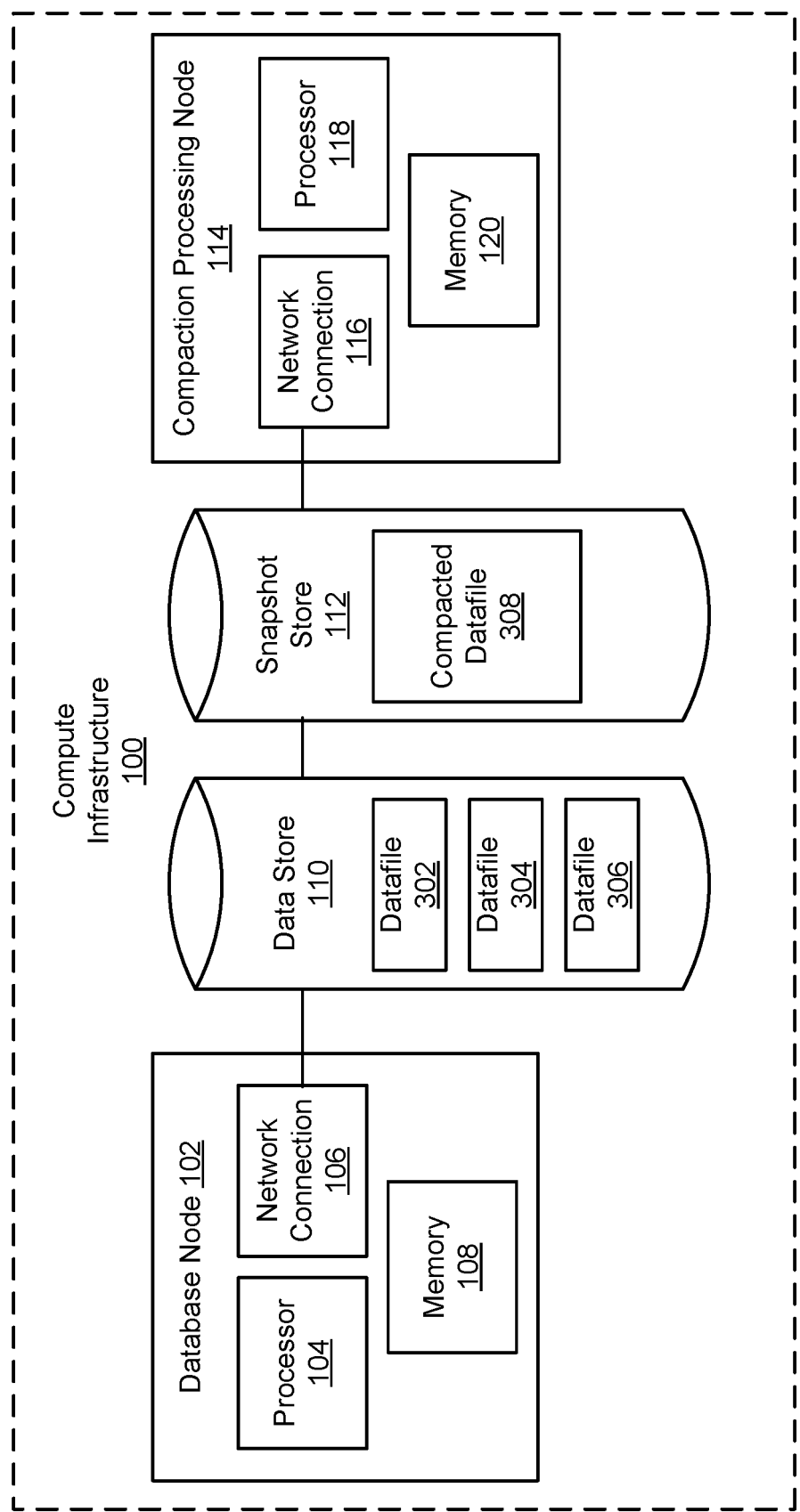

The compaction processing node 114 generates 225 a compacted datafile by compacting the datafiles of the snapshot 124 in the snapshot store 112. Furthermore, the compaction processing node 114 stores the compacted datafile in the snapshot store 112. With reference to FIG. 3D, the compacted datafile 308 is created and stored in the snapshot store 112. The compacted datafile 308 is a single file that incorporates information from the multiple datafiles 302, 304, and 306 of the snapshot 124. In some embodiments, the datafiles 302 through 306 include SSTables in Cassandra that store associations between keys and values for records in the data store 110. Here, the compaction may include merging of keys, resolving column updates or discarding tombstones. Other types of compaction or processing on the snapshot 124 may be performed to generate the compacted datafile.

Figure 3E:
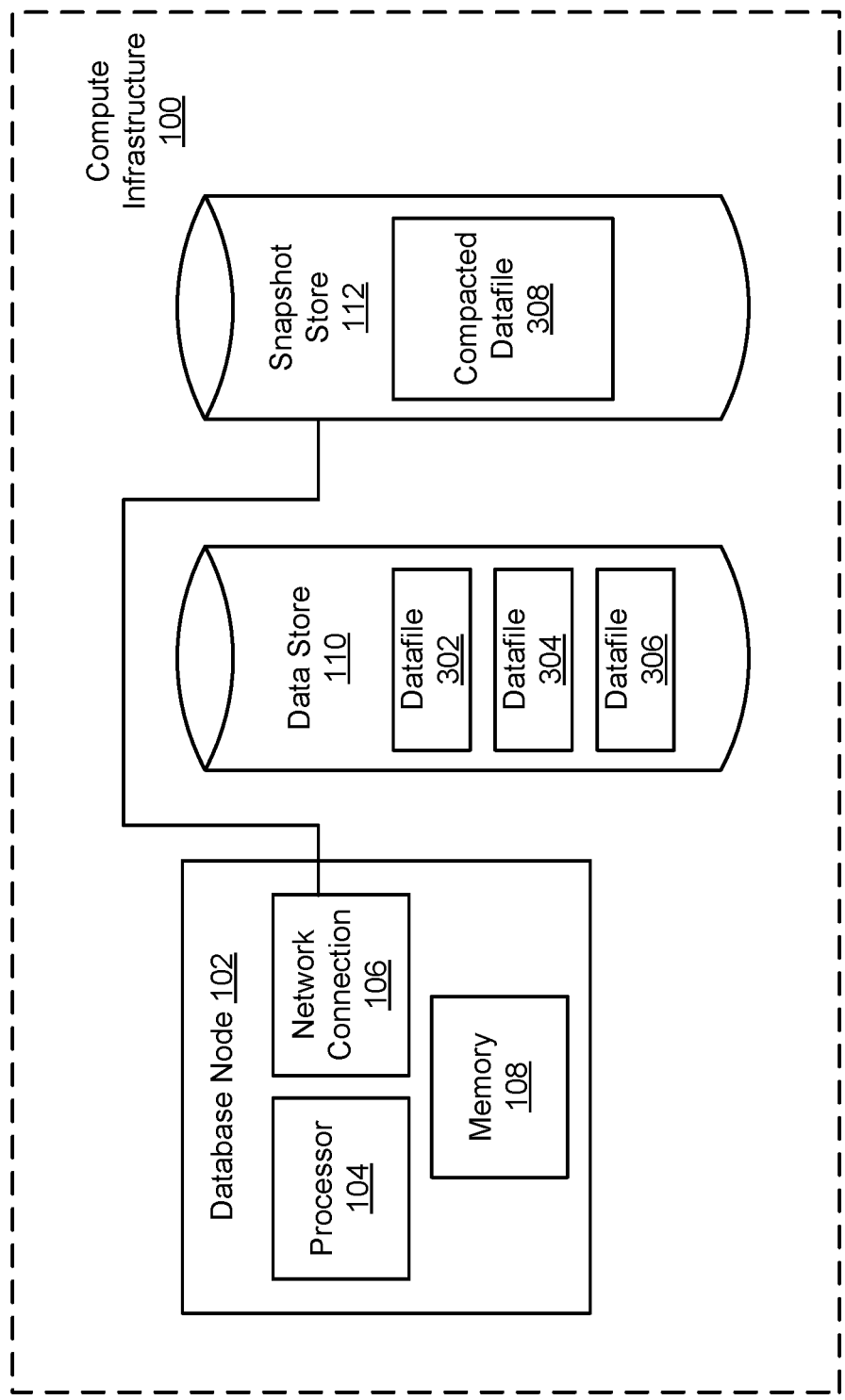

The snapshot store 112 is attached 230 with the database node 102 which uses the snapshot store 112 as a data store 110. With reference to FIG. 3E, the snapshot store 112 is attached with the database node 102. Furthermore, the compaction processing node 114 is shut down to reduce usage of compute resources in the compute infrastructure 100. In some embodiments, the compaction processing node 114 coordinates with the database 102 to replace the data store 110 with the snapshot store 112.

The data store 110 is detached 235 from the database node 102. The snapshot store 112 replaces the data store 110 as the database managed by the database node 102, and thus the data store 110 is no longer needed. In some embodiments, the data store 110 is an instance of a cloud compute infrastructure 100. The data store and its associated compute resources are shut down in the compute infrastructure 100.

In some embodiments, the database node 102 may have written one or more additional datafiles 122 to the data store 110 subsequent to creation of the snapshot 124, but prior to attaching with the snapshot store 112. Here, an additional datafile 122 from the data store 110 is transferred to the snapshot store 112, and then the data store 110 is detached from the database node 102 or shut down.

Figure 3F:
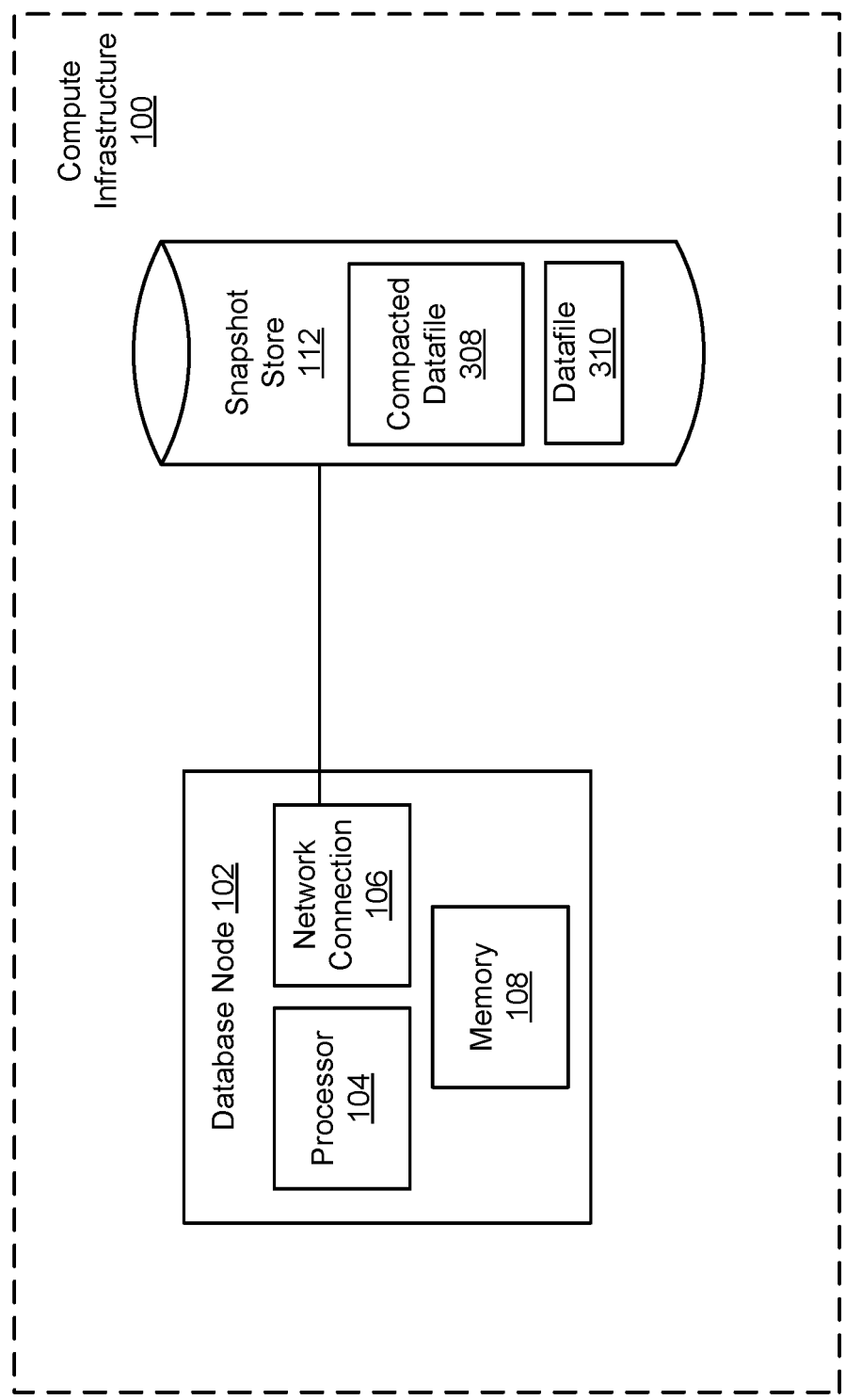

The process 200 may return to 205, where the database node 102 stores datafiles in the data store 112 attached with the database node 102. With reference to FIG. 3F, the database node 102 may write additional datafiles, such as datafile 310, to the snapshot store 112, which is also referred to as the data store 112 when used by the database node 102 to write the datafiles. The additional datafiles may be stored in the data store 112 with the compacted datafile 308, resulting in multiple datafiles that may be treated with another compaction process.

Figure 4:
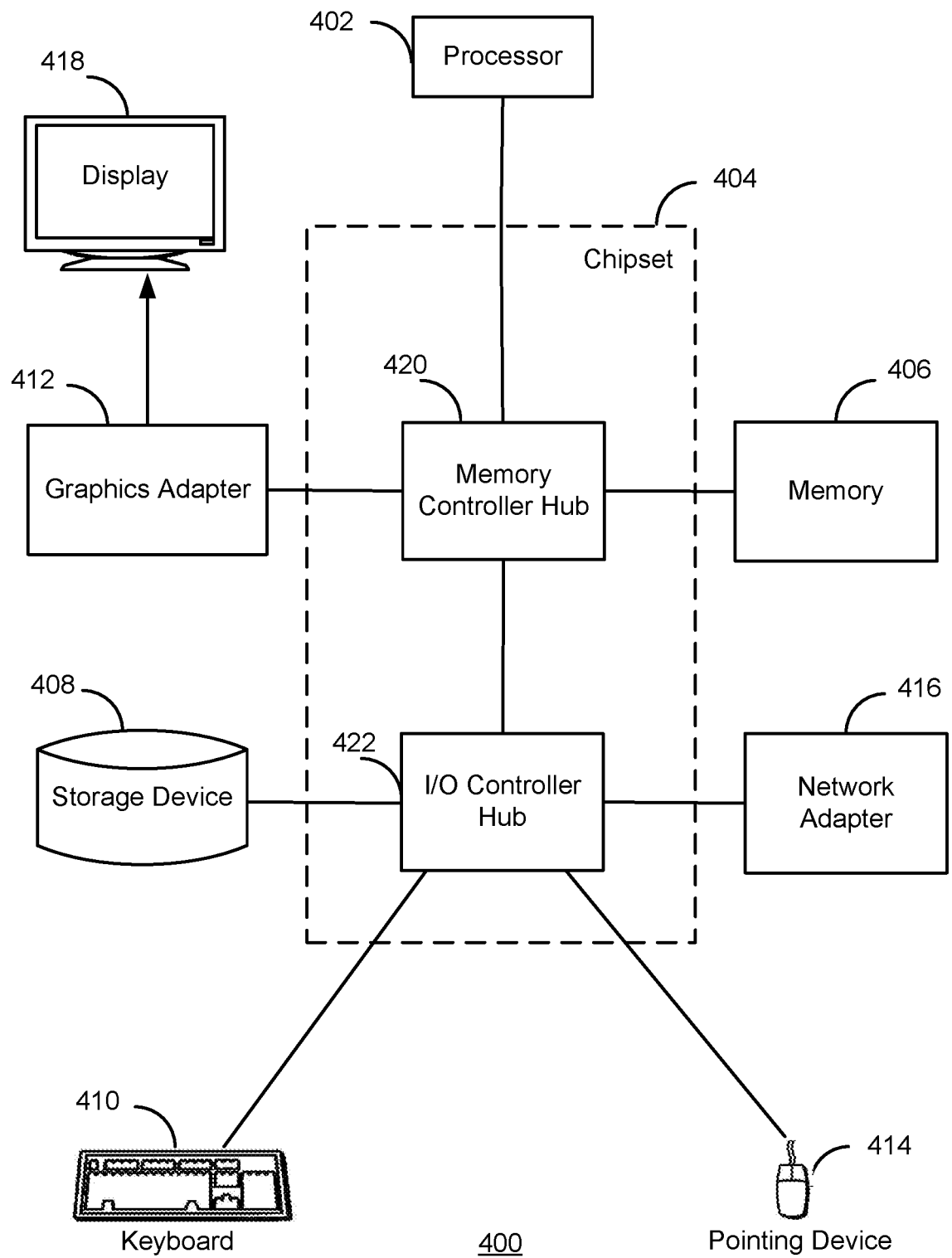
FIG. 4 is a schematic block diagram of a computer used in the compute infrastructure, in accordance with some embodiments.

FIG. 4 is a schematic block diagram of a computer 400, according to one embodiment. The computer 400 is an example of circuitry that implements components of the compute infrastructure 100. Illustrated are at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display device 418 is coupled to the graphics adapter 412. A storage device 408, keyboard 410, pointing device 414, and network adapter 416 are coupled to the I/O controller hub 422. Other embodiments of the computer 400 have different architectures. For example, the memory 406 is directly coupled to the processor 402 in some embodiments.

The storage device 408 includes one or more non-transitory computer-readable storage media such as a hard drive, compact disk read-only memory (CD-ROM), DVD, or a solid-state memory device. The memory 406 holds instructions and data used by the processor 402. The pointing device 414 is used in combination with the keyboard 410 to input data into the computer system 400. The graphics adapter 412 displays images and other information on the display device 418. In some embodiments, the display device 418 includes a touch screen capability for receiving user input and selections. The network adapter 416 couples the computer system 400 to a network. Some embodiments of the computer 400 have different and/or other components than those shown in FIG. 4. For example, the keyboard 410, pointing device 414, or other user input device may be omitted.

The computer 400 is adapted to execute computer program modules for providing functionality described herein. For example, some embodiments may include a computing device including one or more modules configured to perform the process 200 shown in FIG. 2. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 408, loaded into the memory 406, and executed by the processor 402.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure. For example, the initiation of a processing node instance in a cloud compute infrastructure to reduce resource consumption in another node is not limited to compaction of datafiles, and may be applicable to other types of processing or other types of data.

What is claimed is:

1. A method for compacting datafiles, comprising:
storing, by a database node of datafiles in a first data store attached with the database node;
generating a snapshot of the first data store including the datafiles;
storing the snapshot in a second data store attached with a compaction processing node, the compaction processing node being an initiated instance of a cloud compute infrastructure, the compaction processing node including first compute resources that are separate from second compute resources of the database node;
generating, by the compaction processing node, a compacted datafile by compacting the datafiles of the snapshot in the second data store, the compaction processing node being shut down subsequent to generating the compacted datafile;
storing the compacted datafile in the second data store; and
attaching the second data store including the compacted datafile to the database node; and
writing, by the database node, a second datafile in the attached second data store, the second data file being stored in the second data store with the compacted data file.

2. The method of claim 1, further comprising, subsequent to storing the snapshot in the second data store and prior to generating the compacted datafile, initiating the compaction processing node in the cloud compute infrastructure.

3. The method of claim 1, further comprising, subsequent to storing the datafiles in the first data store and prior to storing the snapshot in the second data store, initiating the second data store.

4. The method of claim 1, wherein the first and second data stores are cloud storage volumes of the cloud computing infrastructure.

5. The method of claim 1, further comprising subsequent to storing the snapshot in the second data store, detaching the first data store from the database node and shutting down the first data store.

6. The method of claim 1, further comprising:
subsequent to storing the snapshot in the second data store, storing, by the database node, a third datafile in the first data store; and subsequent to generating the compacted datafile and prior to attaching the second data store to the database node, storing the third datafile in the second data store.

7. The method of claim 1, further comprising:
generating a second snapshot of the second data store including the compacted datafile and the second datafile;
storing the second snapshot in a third data store of the compute infrastructure attached with the compaction processing node of the compute infrastructure;
generating, by the compaction processing node, a second compacted datafile by compacting the compacted datafile and the second datafile in the third data store; and
attaching the third data store to the database node.

8. A system for compacting datafiles, comprising:
a first data store;
a database node attached with the first data store, the database node configured to:
  store datafiles in the first data store; and
  generate a snapshot of the first data store including the datafiles;
a second data store attached with a compaction processing node, the second data store configured to store the snapshot; and
the compaction processing node, the compaction processing node being an initiated instance of a cloud computing infrastructure, the compaction processing node including first compute resources that are separate from second compute resources of the database node, the compaction processing node configured to:
  generate a compacted datafile by compacting the datafiles of the snapshot in the second data store;
  store the compacted datafile in the second data store; and
  shut down after generating the compacted datafile; and
wherein the database node is further configured to:
  attach with the second data store including the compacted datafile subsequent to the compacted datafile being stored in the second data store; and
  write a second datafile in the attached second data store, the second data file being stored in the second data store with the compacted data file.

9. The system of claim 8, wherein the database node is further configured to:
store the snapshot in the second data store; and
subsequent to storing the snapshot in the second data store, initiate the compaction processing node.

10. The system of claim 9, wherein the database node is further configured to, subsequent to the compaction processing node generating the compacted datafile, shut down the compaction processing node.

11. The system of claim 8, wherein the database node is further configured to, subsequent to storing the datafiles in the first data store and prior to storing the snapshot in the second data store, initiate the second data store.

12. The system of claim 8, wherein the first data store and the second data store are instances of the cloud computing infrastructure, and the first and second data stores are cloud storage volumes.

13. The system of claim 8, wherein the database node is further configured to, subsequent to storing the snapshot in the second data store, detach the first data store from the database node and shut down the first data store.

14. The system of claim 8, wherein the database node is further configured to:
subsequent to storing the snapshot in the second data store, store a third datafile in the first data store; and
subsequent to generating the compacted datafile and prior to attaching the second data store to the database node, store the third datafile in the second data store.

15. A non-transitory computer readable medium storing instructions that when executed by a processor cause the processor to:
store datafiles in a first data store attached with the processor;
generate a snapshot of the first data store including the datafiles;
store the snapshot in a second data store attached with a compaction processing node, the compaction processing node being an initiated instance of a cloud compute infrastructure, the compaction processing node including first compute resources that are separate from the processor;
responsive to the compaction processing node generating a compacted datafile by compacting the datafiles of the snapshot in the second data store, attach with the second data store including the compacted datafile and shut down the compaction processing node; and
write an additional datafile in the attached second data store, the additional data file being stored in the second data store with the compacted data file.

16. The non-transitory computer readable medium of claim 15, wherein the instructions further cause the processor to, subsequent to storing the snapshot in the second data store, detach the first data store and shut down the first data store.

* * * * *